United States Patent [19]
Kartschmaroff et al.

[11] 4,366,136
[45] Dec. 28, 1982

[54] MOLDABLE PREPOLYMERS BASED ON ALKALI METAL SILICATES AND ALKALINE EARTH METAL SILICATES

[75] Inventors: Peter Kartschmaroff, Arlesheim; Ewald Forster, Allschwil; Armin Schaffner, Basel, all of Switzerland

[73] Assignee: Ciba-Geigy Corporation, Ardsley, N.Y.

[21] Appl. No.: 317,959

[22] Filed: Nov. 4, 1981

Related U.S. Application Data

[63] Continuation of Ser. No. 192,577, Sep. 30, 1980, abandoned, which is a continuation-in-part of Ser. No. 112,766, Jan. 17, 1980, abandoned, which is a continuation of Ser. No. 939,511, Sep. 5, 1978, abandoned.

[30] Foreign Application Priority Data

Sep. 6, 1977 [CH] Switzerland ............... 10854/77

[51] Int. Cl.$^3$ ............... C01B 33/24
[52] U.S. Cl. ............... 423/331; 106/74; 106/38.3; 423/332
[58] Field of Search ............... 423/331, 332; 106/74, 106/38.3, 38.9

[56] References Cited

U.S. PATENT DOCUMENTS

| | | | |
|---|---|---|---|
| 1,956,895 | 5/1934 | Chapman et al. | 106/9 |
| 2,919,996 | 1/1960 | Tela | 106/74 |
| 2,943,948 | 7/1960 | Allen | 106/288 |
| 2,948,701 | 8/1960 | Baker et al. | 260/41.5 |
| 3,033,700 | 5/1962 | Buckman et al. | 106/306 |
| 3,102,037 | 8/1963 | Kimpel | 106/57 |
| 3,129,134 | 4/1964 | Lagerstrom | 162/181 |
| 3,707,386 | 12/1972 | Wilhelm | 106/84 |
| 3,990,903 | 11/1976 | Mallow | 106/84 |

FOREIGN PATENT DOCUMENTS

| | | |
|---|---|---|
| 390189 | 3/1933 | United Kingdom . |
| 1077973 | 8/1967 | United Kingdom . |
| 1224030 | 3/1971 | United Kingdom . |
| 1367166 | 9/1974 | United Kingdom . |

Primary Examiner—Lorenzo B. Hayes
Attorney, Agent, or Firm—Luther A. R. Hall

[57] ABSTRACT

Prepolymers of alkali metal silicates and/or alkaline earth metal silicates and metal oxides, which can be used as molding compositions, preferably compression molding compositions, for the production of compression-moldable laminates or of insulating sheets, are obtained by a method wherein a mixture of solid alkali metal silicates and/or alkaline earth metal silicates, and/or aqueous solutions of such silicates, with or without addition of water, and of divalent to tetravalent metal oxides, the ratio of metal oxide to silicate in the mixture being from 1:1 to 1:9, expressed in parts by weight of solids, and the homogenized mixture having a water content of from 10 to 50% by weight, based on the total amount of mixture, is allowed to pre-react in the temperature range of 10° to 50° C. until the water content of the mixture has decreased by from 0.1 to 25% by weight and a product which is sufficiently tough and dry to permit comminution is obtained, and this product is comminuted and then heated at temperatures of up to 120° C. until the prepolymer obtained has a water content of from 20 to 2% by weight.

6 Claims, No Drawings

MOLDABLE PREPOLYMERS BASED ON ALKALI METAL SILICATES AND ALKALINE EARTH METAL SILICATES

This is a continuation of application Ser. No. 192,577, filed Sept. 30, 1980, now abandoned, which in turn is a continuation-in-part of application Ser. No. 112,766, filed Jan. 17, 1980, now abandoned, which in turn is a continuation of application Ser. No. 939,511, filed Sept. 5, 1978, now abandoned.

The present invention relates to prepolymers obtainable from alkali metal silicates and/or alkaline earth metal silicates and metal oxides, to processes for their preparation and to their use as moulding compositions, especially in compression moulding compositions.

The use of sodium silicate solutions (waterglass) as sealants or mineral putties has been known for a long time. Such putties harden within a few hours at room temperature; accordingly, they are not stable on storage. The mouldings, or moulded materials, obtained from alkali metal silicate solutions by heating to elevated temperatures, with simultaneous shaping, exhibit the disadvantage that because of inadequate strength they cannot be considered as materials of construction, furthermore, they are water-soluble and accordingly insufficiently resistant to atmospheric moisture.

There has been no lack of attempts to reduce or overcome the disadvantage of insufficient resistance to atmospheric moisture by using modified alkali metal silicate solutions for the production of the moulded materials. For example, German Patent Specification No. 594,257 proposes using a concentrated solution of alkali metal borates and alkali metal silicates, or of alkali metal borosilicates, as the starting material for the production of moulded materials having improved water resistance. It is true that these moulded materials exhibit comparatively improved moisture resistance, but they are not watertight and must, to achieve the latter property, be impregnated with resin solution, asphalt or the like. Further, German Offenlegungsschrift No. 1,571,607 discloses that the moisture resistance of binders or impregnating agents based on waterglass can be increased by adding metal compounds having a particle size of less than 100μ, these particles causing precipitation of $SiO_2$ and formation of silica gel. The products obtained in this way also require a surface treatment, for example with bitumen, waxes, stearates or silicones, to improve the moisture resistance.

Further, in British Patent Specification No. 1,367,166 a homogeneous mass consisting of anhydrous sodium silicate, aqueous sodium silicate solution and boric acid is heated to dissolve the anhydrous sodium silicate, and is comminuted after cooling. These particles are then rendered partially anhydrous by renewed heating, whereby a porous, pre-foamed material is obtained, which can, by further heating, be converted into completely expanded foam articles. However, such modified sodium silicates are unsuitable for the production of compression moulding compositions because, on pressing, they give inhomogeneous porous products which, on removal from the mould, expand to up to twice their volum.

British Patent Specification No. 1,077,973 has already described the preparation of inorganic polymers by reacting aluminium oxychloride with, for example, an alkali metal silicate or alkali metal metasilicate. These polymers can be compression moulded, but have the disadvantage that their processing requires excessively long press times.

U.S. Pat. Nos. 2,919,996 and 2,948,701 disclose generally the product of reacting at ambient temperature an alkaline silicate (water glass) and a polyvalent metal oxide, heating the mixture to concentrate it and to cause polymerization to occur with loss of water, and finally preparing a finally divided siliceous product.

U.S. Pat. No. 2,919,996 describes a method of polymerization for silicate polymers which differs in some critical parameters from the instant process. This reference describes a process for the manufacture of fibrils consisting of linear polysilicates whereby the starting solution has a water content of about 60% well above the maximum allowed in the instant process using a starting solution containing about 40% solids (see col. 6, line 71; and claim 1).

The fibrils prepared by the process of this reference after drying are not suitable as molding compositions. The product of this patent disintegrates in the molding form after the molding process and is totally unsuitable as a molding composition.

U.S. Pat. No. 2,948,701 discusses a process to make finely divided substantially gel-free precipitates from an aqueous solution of sodium silicate in the presence of an organic coacervating agent and by the helpf of an insolubilizing agent which is an electrolyte such as a metal salt, oxide or hydroxide and without applying heat to the solution to reduce the water content (see for instance, Example 6). The process of this reference requires no grinding step and the product obtained as useful as pigments and fillers. Such materials are not suitable for molding compositions as the moldings made therefrom crumble when the mold is removed.

U.S. Pat. No. 2,943,948 describes the preparation of pigments by reaction of calcium silicate with an aqueous solution of sodium silicate and calcium chloride followed by further reaction with aluminium chloride (Example I). This process is clearly very different from the instant process, and does not lead to satisfactory molding compositions.

It has now been found that by a stepwise condensation of alkali metal silicates and/or alkaline earth metal silicates with metal oxides, carried out by subjecting mixtures of solid alkali metal silicates and/or alkaline earth metal silicates, aqueous solutions of such silicates, and certain metal oxides to a special drying and pre-reaction procedure, prepolymers are obtained which, in contrast to the known inorganic formulations based on silicates, can be processed as compression moulding compositions, and for the production of laminates, by means of the machinery employed for organic moulding compositions, under the conditions usual for the latter materials, for example short press times, to give mouldings with remarkable properties, in particular excellent heat resistance, inherent flame resistance, good mechanical strength and light resistance.

Accordingly, the present invention relates to novel prepolymers of alkali metal silicates and/or alkaline earth metal silicates and metal oxides, which are moldable by heat and pressure and which are obtained by a method wherein a mixture of solid alkali metal silicates and/or alkaline earth metal silicates, and/or aqueous solutions of such silicates, with or without addition of water, and of divalent to tetravalent metal oxides, the ratio of metal oxide to silicate in the mixture being from 1:1 to 1:9, expressed in parts by weight of solids, and the homogenised mixture having a water content of from 10 to 50% by weight, based on the total amount of mixture, is allowed to pre-react in the temperature range of 10° to 50° C. until the water content of the mixture has decreased by from 0.1 to 25% by weight and a product which is sufficiently tough and dry to permit comminution is obtained, and this product is comminuted and then heated at temperatures of up to 120° C. until the prepolymer obtained has a water content of from 20 to 2% by weight.

The instant prepolymers behave differently from the polysilicates of the prior art references cited above. The instant process leads to prepolymer materials which are reactive and which crosslink upon compression molding.

In the instant process, it is important that one start from a homogenized mixture having a water content not over 50% by weight and that the temperature during the first pre-reaction cycle does not rise above 50° C. in order to give a prepolymer which is tough and dry and which can be comminuted. The water content of the prepolymer can be then reduced at higher temperatures (up to 120° C.).

Preferably, the invention relates to prepolymers of alkali metal silicates and/or alkaline earth metal silicates and metal oxides, which are obtained by a method wherein a homogenised mixture of solid alkali metal silicates and/or alkaline earth metal silicates, and aqueous solutions of such silicates, and divalent to tetravalent metal oxides, the proportion of silicate in aqueous solution in the mixture being less than 35% by weight, preferably 20 to 33% by weight, based on the total dry amount of silicate, and the ratio of metal oxide to silicate being from 1:1 to 1:6, expressed as parts by weight of solids, and the homogenised mixture having a water content of from 25 to 50% by weight, based on the tatal amount of mixture, is allowed to pre-react in the temperature range of 20° to 50° C. until the water content of the mixture has decreased by from 0.1 to 20% by weight and a product which is sufficiently tough and dry to permit comminution is obtained, and this product is granulated or ground and then heated at temperatures of up to 120° C. until the prepolymer obtained has a water content of from 15 to 4% by weight.

In particular, mixtures of solid (hydrated) alkali metal silicates and alkaline earth metal silicates, preferably alkali metal silicates, and dissolved alkali metal silicates (waterglass), together with divalent metal oxides, preferably zinc oxide, are employed for the preparation of the prepolymers, the homogenised mixture preferably having a water content of from 30 to 45 percent by weight, based on the total amount of mixture.

Compared to the processes known from British patent specification No. 1,367,166 and British patent specification No. 1,077,973 for the preparation of moulded materials based on silicates, the mixtures for the preparation of the prepolymers according to the invention on the one hand employ a smaller amount of dissolved silicates and on the other hand do not require dissolution of the solid hydrated silicates.

The alkaline earth metal silicates used are preferably the calcium silicates and magnesium silicates, especially the calcium silicates, and the alkali metal silicates used are preferably the sodium silicates and potassium silicates, advantageously the less alkaline sodium silicates, especially those having a molar ratio $Na_2O/SiO_2$ of 1:3.3.

If desired, ammonium silicates may also be added to the mixtures for the preparation of the prepolymers, especially if the prepolymers, or the compression moulding compositions prepared therefrom, are to have a lower alkalinity.

Suitable tetravalent metal oxides are $PbO_2$, $TiO_2$ and $ZrO_2$ and suitable trivalent metal oxides are $Al_2O_3$, $Pb_2O_3$ and $Fe_2O_3$. Preferably, the divalent metal oxides, for example MgO, CaO, BaO and especially ZnO, are used.

The ratio of metal oxide to alkali metal silicate and/or alkaline earth metal silicate may be selected between the values of 1:1 and 1:6, expressed in parts by weight based on solids. In general, if a high proportion of metal oxide is used, the prepolymers obtained required shorter press times when processed as a compression moulding composition, and the compression mouldings obtained have better strength.

To achieve rapid homogenisation of the components of the mixture, emulsifiers may also be added to the mixture. Neutral, anionic or cationic emulsifiers are suitable for this purpose, and are added to the mixture in amounts of 0.2 to 3.0% by weight, based on the total dry weight. The commercially available emulsifiers "Mersolat H and W" (BAYER) and "Aerosol" (AMCY) are particularly suitable. The usual mixing devices, for example fluid mixers or bowl kneaders, may be employed for homogenising the components of the mixture. As a rule, a homogeneous mixture is first prepared from the silicate components, and the metal oxides are then added. Even when homogenising the components of the mixture, care must be taken that the temperature of the material should not exceed 30° C.; this control is achieved by introducing the components of the mixture at an appropriate rate and/or by cooling the mixing equipment.

Accordingly, the present invention also relates to the process for the preparation of the novel prepolymers from alkali metal silicates and/or alkaline earth metal silicates and metal oxides.

The present invention relates to prepolymers, that is to say, to condensations products which are reactive and which are suitable for molding compositions. Although the method for the manufacture of the claimed prepolymers reads on concentrating an aqueous solution of ingredients and grinding of the reaction products, there are more than one critical reaction condition necessary in order to obtain the claimed prepolymer.

a. The water content of the starting composition should not be greater than 50% by weight.

b. The temperature of the pre-reaction stage should not be greater than 50° C.

c. After the pre-reaction there must be obtained a tough and dry product which can be comminuted, and d. Only at this stage can the residual water content be removed from the pre-reaction product at temperatures up to 120° C.

In contrast to these reaction conditions, all the prior art processes start from an aqueous solution having a water content more than 50% by weight. They also do not teach that the pre-reaction must be carried out at a temperature not greater than 50° C. until a tough product is obtained.

The process according to the invention is preferably carried out by starting from a homogenised silicate/metal oxide mixture containing from 25 to 50% by weight of water, based on the total amount of the mixture, allowing this mixture to pre-react preferably at 20° to 30° C. until the water content of the mixture has decreased by 5 to 20% by weight and a product which is sufficiently tough and dry to permit comminution is obtained, then granulating or grinding the reaction product and thereafter heating it at temperatures of 80° to 110° C. until the prepolymer obtained contains from 15 to 4, preferably from 12 to 4, % by weight of water.

In the pre-condensation stage, care must be taken that the reaction mixture should not be heated above 50° C., since otherwise products are formed which cannot be converted into reactive prepolymers, i.e. prepolymers suitable for moulding compositions, especially for compression moulding compositions. During the precondensation stage, the material undergoing reaction can be comminuted, or regranulated, once or several-fold.

The subsequent comminution of the precondensate by granulation or grinding is advantageously carried out in such a way that the average particle size of the granules or ground material is not less than 2 mm diameter, since, if the specific surface area of the granules or ground material is too large, undesirable carbonation of the silicate by the $CO_2$ contained in the air occurs, giving products with less advantageous properties. If appropriate, the reaction mixture may be comminuted or regranulated once, or several-fold, already during the pre-condensation stage.

The conventional drying cabinets or circulating air oven can be used for the further condensation of the pre-condensates, which is preferably carried out at temperatures of 80° to 110° C., especially within the temperature range of 90° to 100° C.

The water content of the individual reaction products can be determined thermo-gravimetrically on samples taken from the reaction mixture.

As already mentioned, the novel prepolymers are valuable compression moulding compositions which can be processed, unfilled or mixed with fillers, to give moulded materials having the properties of industrially valuable materials of construction. If the prepolymers according to the invention are used as unfilled compression moulding compositions, the latter preferably contain from 4 to 8% by weight of water. For filled compression moulding compositions, prepolymers containing from 8 to 15% by weight of water are preferred.

The fillers used are both inorganic and organic substances with or without a reinforcing action. Examples of inorganic fillers without a reinforcing action are ground natural mineral materials, for example wollastonite, steatite, talc, quarzt, powder, mica, chalk powder, slate powder, non-burnt or burnt kaolin, asbestos and industrial products such as cement, glass or slag. Reinforcing fillers which may be used are inorganic fibrous materials, for example glass, asbestos, boron or carbon fibres, which may also be in the form of fabrics or mats. Since organic fillers and reinforcing agents, such s wood flour, celluloses and natural or synthetic fibres, for example cotton, polyamide fibres, polyester fibres or polyacrylonitrile fibres, have an adverse effect on the heat resistance of the end products, they are only used to manufacture products with lesser requirements in respect of heat resistance. Pigments or dyes may also be added to the compression moulding compositions.

The proportion of the fillers or additives in the filled compression moulding compositions depends on the particular intended application of the end products and may be up to three times the amount of the prepolymer. The compression moulding mixtures can be prepared in accordance with various methods, in a manner known per se. The choice of the mixing process depends especially on the fillers or reinforcing agents used. The prepolymers of the invention can simply be dry-homogenised, in suitable mixing equipment, with the ground fillers or reinforcing agents. The fillers or reinforcing agents can also be added to the reaction mixture during the concensation process in which the prepolymers are prepared. The fillers can also already be added during the pre-condensation stage, if appropriate when preparing the homogenised mixture.

The prepolymers of the invention, and especially their precondensates, may also be used as binders and impregnants for the production of fibre-reinforded laminates, by applying an aqueous slurry, containing the prepolymer or its precondensate, to the carrier material and drying the latter at temperatures of up to 120° C. until the impregnated material has a water content of 15 to 2% by weight, based on impregnated material. The prepregs thus obtained may be used for the production of laminates.

EXAMPLE 1

(A) Preparation of Prepolymers

The following are initially introduced into a bowl kneader (of the "Meili" type) of 10 liters capacity: 3.30 kg of a 37% aqueous sodium silicate solution (38° Be, molar ratio $Na_2O/SiO_2=1:3.3$, pH=11; technical-grade product) and 5.32 kg of sodium silicate powder (residue on calcination at 900° C.: 82% by weight). These components are then homogenised for 10 minutes, with the kneading paddles running at a speed of 45/68 revolutions per minute, to give a thixotropic mass. A further 3.40 kg of sodium silicate solution (as above), 2.00 kg of zinc oxide ("Weissiegel") and 0.03 kg of the pigment "Light Yellow 8 G" (Bayer) are then added to the mixing charge in the course of about 10 minutes, with constant kneading. The water content of the mixture is 36.7% by weight.

The kneader is closed and the reaction mixture is kneaded further for 15 minutes at 25°–30° C.

The homogenised kneaded material is then spread on drying trays, in layers 20 mm thick. After standing for 10 to about 15 hours, the tough dry mass is granulated in a "Werner Pfleiderer", using a screening sieve with a 3 mm insert. The granules are again spread on trays and kept for, say, twice 15 hours, with intermediate granulation, at room temperature; during this period the water content of the granules falls to 25–32% by weight. After shaking, this product is kept for 2-3 hours in a circulating air drying cabinet at 90° C., until the water content falls to about 20% by weight.

After repeated comminution, the product is treated for a further 1-3 hours at 120° C. oven temperature until the water content has been reduced to 11% by weight.

Part of the ground material is dried further at an oven temperature of 120° C. until it has a water content of 5% by weight.

(B) Use of the Prepolymers 1. 1.0% by weight of "OP-Wachs" (a modified montan wax from BASF) is added to the prepolymer obtained as described above, which has a water content of 5% by weight, and after grinding in a pin mill the material is directly processed as a compression moulding composition. Compression-moulding is carried out in the conventional surface-treated steel moulds at 800–1,000 kg/cm² pressure and at 250°–260° C. The 10 mm thick testspecimens according to DIN 53,470 require a press time of about 5 minutes and exhibit high strengths.

2. 3.30 kg of the prepolymer obtained above, which has a water content of 11% by weight, and 3.30 kg of calcium silicate (ground wollastonite "P 1" from Cabot Corp., USA) are metered into a dry fluid mixer (of the "Papenmeier" type) of 20 liters capacity and are mixed for 2 minutes. A further 3.30 kg of the prepolymer, containing 11% by weight of water, and 0.02 kg of ground zinc stearate are introduced and the mixture is homogenised for 5 minutes. The resulting compression moulding composition is compression-moulded as a powder, at 250°–260° C., as in Example B1.), to give moulded articles:

The press time required to produce test specimens according to DIN 53,470 (10 mm thickness) is 5 minutes.

The test specimens exhibit the following properties:

| Specific gravity | 2.41 g/cm$^3$ |
| Compressive strength (DIN[+] 53,454) | 171 N/mm$^2$ |
| Ball indentation hardness (VDE[++] 0304) | 295 N/mm$^2$ |
| Impact strength (VSM[+++] 77,105) | 0.160 N.cm/mm$^2$ |
| Linear coefficient of thermal expansion (VDE 0304) at 25°–150° C. | 6.5 × 10$^{-6}$ (degree$^{-1}$) |
| Flammability (UL[++++] 94) | VO |
| Light resistance ("Hanau 150" Xenotest) | >2,000 hours |

[+]DIN = Deutsche Industrie-Norm
[++]VDE = Verein Deutscher Elektrotechniker
[+++]VSM = Verein Schweizer Maschinenindustrieller
[++++]UL = Underwriter's Laboratories 3. 5.00 kg of the prepolymer obtained above, containing 11% by weight of water, 4.00 kg of calcium silicate (ground wollastonite "P 1"), 1.00 kg of talc (residue on calcination at 850° C.: 95.7% by weight) and 0.01 kg of ground zinc stearate are introduced into a 30 liter ball mill and are homogenised for 6–8 hours.

The compression moulding composition obtained is compression-moulded as described in Example B1.), to give moulded articles.

The test specimens exhibit the following properties:

| Specific gravity | 2.44 g/cm$^3$ |
| Compressive strength (DIN 53,454) | 150 N/mm$^2$ |
| Ball indentation hardness (VDE 0304) | 162 N/mm$^2$ |
| Impact strength (VSM 77,105) | 0.170 N.cm/mm$^2$ |
| Flammability (UL 94) | VO |
| Light resistance (Xenotest) | >2,000 hours |

4. 2.0 kg of the prepolymer obtained above, containing 11% by weight of water, 2.0 kg of asbestos fibres (washed, iron-free quality, 3–10 mm), and 1.0 kg of copper filings (size 0.6×1.5×4.0–12.0 mm) are introduced into a mixer of 10 liters capacity and are then homogenised for 30 minutes.

The moulding material obtained is compression-moulded in steel moulds, heated to 300° C., to give mouldings of size 45×30×15 mm, the press time being about 1–2 minutes per mm thickness of moulding. The mouldings obtained are distinguished by good mechanical values and high abrasion resistance.

5. Rock wool fibres 3–10 mm long are impregnated, on a calendering installation, with the product freshly prepared according to Example 1, containing more than 35% by weight of water.

The impregnation conditions are selected so that the ratio of precondensate to rock wool is in the range from 1:3 to 1:2.

The impregnated material is fed directly onto the conveyor belt of a tunnel oven. The oven zones are controlled to 90°, 110° and 130° C. The passage time is regulated so that a product containing 10–15% by weight of water is formed. This product is compression-moulded in steel moulds at 200° C. under a pressure of 200 kg/cm$^2$ to give mouldings of size 150×70×10 mm.

The resulting compression mouldings are distinguished by good strength characteristics and good heat insulation.

6. The precondensate obtained according to Example 1, containing 20 percent by weight of water, is suspended in a two-fold amount of water, using an agitator.

Glass fibre mats which have first been sprayed in a chamber with the precondensate suspension issuing from 6 nozzles, giving an impregnation of 10% by weight based on the dry amount of impregnant, are drawn upwards through a tower having a height of 2.0 meters and a diameter of 60 cm. Air preheated to 200° C. flows downwards through the tower, and the passage time is selected so that the impregnated mats contain from 2 to 5 percent by weight of water.

The impregnated mats are pressed in a teflonised aluminium mould at 200°–220° C. under a pressure of 20–50 kg/cm$^2$ to give mouldings of size 60×30×10 mm.

The mouldings obtained are distinguished by high heat resistance, good insulating capacity and inherent flame resistance.

EXAMPLE 2

(A) Preparation of the Prepolymers

The following substances are introduced successively, in about 10 minutes, into a bowl kneader (of the "Meili" type) of 20 liters capacity, with constant kneading: 4.66 kg of a 37% aqueous sodium silicate solution (38 Be, molar ration $Na_2O/SiO_2=1:3.3$, pH=11; technical-grade product), 4.32 kg of sodium silicate powder (residue on calcination at 900° C.=82% by weight) and 0.80 kg of potassium silicate powder (residue on calcination at 900° C.=99% by weight).

After a homogeneous mass has formed, a further 2.00 kg of sodium silicate solution (as above), 4.00 kg of zinc oxide ("Rotsiegel"), introduced in portions, and 0.05 kg of the pigment "Light Yellow 6 R" (Bayer) are added, with constant kneading. The water content of the mixture is 31.7% by weight.

The apparatus is closed and the reaction mixture is homogenised for a further 10 minutes at 25°–30° C.

The kneaded material is then spread on drying trays, in a 20 mm thick layer. After standing for about 15 hours, the tough dry material is granulated in a screening sieve with a 5 mm insert. The granules are again spread on trays and kept at room temperature for about 20 hours, during which the water content of the granules falls to 20–25% by weight. After a pass through a pin mill (Alpine RO 10/6"), the ground material is kept for 3–5 hours at 90° C. in a circulating air drying cabinet until the water content falls to about 12% by weight.

A part of this prepolymer is dried further in a circulating air oven at 100° C. until the water content has been further reduced, to 7–8% by weight.

(B) Use of the Prepolymers 1. 2.0 kg of the prepolymer obtained above, containing about 12% by weight of water, and a mixture of 0.7 kg of calcium silicate (ground "wollastonite P1"), 0.3 kg of talc (residue on calcination at 850° C.: 95.7% by weight) and 0.01 kg of "OP-Wachs" (a modified montan wax from BASF) are metered into a spiral mixer (of the "Nauda" type), and homogenised therein.

The mixture is fed directly to a compactor (of the "Hutt" type). The compacted product is converted to compression moulding granules by granulation followed by sieving-out-of the dust fraction.

The compression moulding composition is molded at 240°–250° C. under a pressure of 1,000–1,2000 kg/cm$^2$ to give mouldings according to DIN 53:470.

The mouldings obtained exhibit the following properties:

| | |
|---|---|
| Compressive strength (DIN, 53,454) | 170 N/mm$^2$ |
| Ball indentation hardness (VDE 0304) | 202 N/mm$^2$ |
| Impact strength (VSM 77,105) | 0.130 N.cm/mm$^2$ |
| Flammability (UL 94) | 5V |
| Light resistance (Xenotest) | >2,000 hours |

2. The prepolymer obtained as described above, containing from 7 to 8% by weight of water, is ground on a pin mill after having added 1% by weight of 37 OP-Wachs". The ground material is processed as a compression moulding composition, without addition of fillers.

Compression mouldings according to DIN 53,470 are produced at 240° C. under a pressure of 800–1,000 kg/cm$^2$.

The pressings obtained exhibit high strengths.

EXAMPLE 3

(A) Preparation of the Prepolymers

The following substances are initially introduced into a bowl kneader of 5 liters capacity: 1.15 kg of a 37% aqueous sodium silicate solution (38 Be, molar ratio Na$_2$O/SiO$_2$=1:3.3, pH=11; technical grade product) and 0.70 kg of sodium silicate powder (residue on calcination at 900° C.: 82% by weight).

After a homogeneous mass has formed, 0.08 kg of "Mersolat W" emulsifier (Bayer), 0.40 kg of zinc oxide ("Weissiegel") and 0.02 kg of the pigment "Cadmium Yellow" are added and the batch is thoroughly mixed in about 10 minutes. 0.83 kg of rock wool ("Egi" from Rheinstahl-Werke), to act as a filler, are then kneaded into the mixture together with 1.00 kg of sodium silicate solution (as above) and the batch is homogenised. The water content of the mixture is 38.3% by weight.

The kneaded material is spread on drying trays, in layers 30 mm thick. After standing for from 5 to 8 hours, the material is granulated in a screening sieve with a 10 mm insert.

The granules are again spread on trays and kept for about 15 hours at room temperature. The water content of the product obtained is 25–28% by weight.

After regranulation, the product is kept for 3–5 hours at 90° C. in a circulating air drying cabinet, until the water content falls to about 15% by weight. After further drying on a roll mill heated to 120° C., a product containing about 8% by weight of water is obtained.

(B) Use of the Prepolymers

The prepolymer obtained as described above, containing about 8% by weight of water, is mixed with 2.5% by weight of glycerol monostearate as a mould release agent in a crusher with a 5 mm insert. The ground material is used directly as a compression moulding composition and is moulded at 270° C. under a pressure of 600–700 kg/cm$^2$ to give mouldings of size 60×30×10 mm.

The mouldings exhibit good strength characteristics, heat resistance, non-flammability and good light resistance.

EXAMPLE 4

(A) Preparation of Prepolymers

The following materials are initially introduced into a bowl kneader of 20 liters capacity, with constant kneading: 2.36 kg of a 37% aqueous sodium silicate solution (38 Be, molar ratio Na$_2$O/SiO$_2$=1:3.3, pH=11; technical-grade product) and 1.15 kg of sodium silicate powder (residue on calcination at 900° C.: 82% by weight).

After a homogeneous mass has formed, a further 2.00 kg of sodium silicate solution (as above) together with 2.00 kg of zinc oxide ("Weissiegel") and 0.03 kg of the pigment "Light Green 5 G" (Bayer) are added in the course of about 5 minutes and the batch is homogenised for a further 10 minutes.

Thereafter, 6,20 kg of calcium silicate (ground wollastonite "P 1" from Carbot Corp., USA) together with 5.00 kg of sodium silicate solution (37%, as above) are introduced in the course of about 15 minutes. The water content of the homogenised mixture is 33.0% by weight.

The mixture is then kneaded for a further 25 minutes at 25°–30° C.

The homogenised kneaded material is emptied out onto drying trays, in layers 20 mm thick. After standing for about 20 hours, the tough dry material is granulated in a screening sieve with a 5 mm insert. The granules contain 25–28% by weight of water.

The granules are sprinkled onto the conveyor belt of a tunnel oven which has 3 zones in which the prevailing temperatures are 90°, 120° and 150° C. The lengths of the zones are in the ratio of 2:1:1.

The rate of travel is now adjusted so that a product with a water content varying between 4 and 8% by weight can be taken off at the end of the oven, whilst the product from the middle zone has a water content of about 12–18% by weight.

(B) Use of the Prepolymers 1.0% by weight of zinc stearate is added to the prepolymer obtained as described above, containing 4–8% by weight of water, and the material is ground in a pin mill and directly processed as a compression moulding composition. Compression moulding is carried out at 800–1,000 kg/cm$^2$ pressure and 250° C. The test specimens produced in accordance with DIN 53,470 have the following properties;

| | |
|---|---|
| Specific gravity | 2.65 g/cm$^3$ |
| Compressive strength (DIN 53,454) | 365 N/mm$^2$ |
| Ball indentation hardness (VDE 0304) | 420 N/mm$^2$ |
| Impact strength (VSM 77,107) | 0.210 N.cm/mm$^2$ |
| Flexural strength (VSM 77,103) | 100 N/mm$^2$ |
| Linear coefficient of thermal expansion (VDE 0304) at 25–150° C. | 8.5 × 10$^{-6}$ degree$^{-1}$ |
| Flammability (UL 94) | 5V |
| Light resistance (Xenotest) | >2,000 hours |

The test specimens were further subjected to the exposure to heat test which comprised heating them in an oven at temperature until 500° C. Practically no alteration could be detected on the rest specimens.

The test specimens were also tested for their resistance to water. After immersion in water for 24 hours at room temperature, the water content of the test specimens was 0.3 percent by weight.

EXAMPLE 5

(A) Preparation of Prepolymers

The following materials are initially introduced into a bowl kneader of 20 liters capacity, with constant kneading: 1.25 kg of sodium silicate powder (residue on calcination at 900° C.: 82% by weight) and 1.45 kg of deionised water. After the mixture has been worked into a slurry for 15 minutes, a further 0.85 kg of sodium silicate powder is added gradually. After a viscous mass has formed, 0.70 kg of zinc oxide ("Rotsiegel") and 0.02 kg og the pigment "Light Blue 2R" (Bayer) are sprinkled in, over about 10 minutes.

After these substances have been uniformly dispersed, a further 1.45 kg of deionised water and 0.85 kg of sodium silicate powder are added. A paste is formed in about 10 minutes, to which are added 3.44 kg of calcium silicate (ground wollastonite "P 1" from Cabot Corp. USA) over 10 minutes, and kneaded-in over a further 20 minutes, the temperature being kept at between 30° and 45° C.

The kneaded material is emptied out onto drying trays, in layers 20 mm thick. After standing for about 15 hours, the tough dry material is granulated in a screening sieve with a 5 mm insert. The granules contain 24–26% by weight of water.

The granules are sprinkled onto the conveyor belt of a tunnel oven which has 3 zones in which the prevailing temperatures are 90°, 110° and 140° C. The lengths of the zones are in the ratio of 2:1:1.

The rate of travel is now adjusted so that a product with a water content varying between 4 and 6% by weight can be taken off at the end of the oven, whilst the product from the middle zone has a water content of about 10–16% by weight.

(B) Use of the Prepolymers 1.0% by weight of zinc stearate is added to the prepolymer obtained as described above, containing 4–6% by weight of water, and the material is ground in a pin mill and directly processed as a compression moulding composition. Compression moulding is carried out at 800 kg/cm² pressure and 250° C. The mouldings produced (60×30×10 cm) exhibit high hardness, good impact strength, absolute non-flammability and high resistance to heat and light. Their specific gravity is 2.60 g/cm³.

EXAMPLE 6

(A) Preparation of Prepolymers

The following materials are initially introduced into a bowl kneader of 10 liters capacity, with constant kneading: 2.30 kg of a 37% aqueous sodium silicate solution (38 Be, molar ratio $Na_2O/SiO_2 = 1:3.3$; pH=11; technical-grade product) and 0.66 kg of sodium silicate powder (residue on calcination at 900° C.: 82% by weight).

After a homogeneous mass has formed, a further 1.50 kg of sodium silicate solution (as above) together with 1.10 kg of zirconium oxide are added in the course of about 10 minutes and the batch is homogenised for a further 10 minutes.

Thereafter, 3.50 kg of calcium silicate (ground wollastonite "P 1" from Cabot Corp., USA) together with 1.50 kg of sodium silicate solution (37%, as above) are introduced in the course of about 15 minutes. The water content of the formulation is about 32.5% by weight. The mixture is then kneaded for a further 25 minutes at 25°–30° C.

The homogenised kneaded material is emptied out onto drying trays, in layers 20 mm thick. After standing for about 18 hours, the tough dry material is granulated in a screening sieve with a 5 mm insert. The granules contain 15% by weight of water.

The granules are sprinkled onto the conveyor belt of a tunnel oven which has 3 zones in which the prevailing temperatures are 90°, 120° and 150° C. The lengths of the zones are in the ration of 2:1:1.

The rate of travel is now adjusted so that a product with a water content varying between 7 and 8% by weight can be taken off at the end of the oven, whilst the product from the middle zone has a water content of about 10% by weight.

(B) Use of the Prepolymers 1.0% by weight of zinc stearate is added to the prepolymer obtained as described above, containing 7–8% by weight of water, and the material is ground in a pin mill and then in a ball mill and directly processed as a compression moulding composition. Compression moulding is carried out at 800–1,000 kg/cm² pressure and 250° C. The test specimens produced in accordance with DIN 53,470 have the followings properties:

| | |
|---|---|
| Specific gravity | 2.23 g/cm³ |
| Compressive strength (DIN 53,454) | 86 N/mm² |
| Ball indentation hardness (VDE 0304) | 273 N/mm² |
| Impact strength (VSM 77,107) | 0.12 N.cm/mm² |
| Flexural strength (VSM 77,103) | 44 N/mm² |
| Flammability (UL 94) | 5V |
| Light resistance (Xenotest) | >2,000 hours |

EXAMPLE 7

(A) Preparation of Prepolymers

The following materials are initially introduced into a bowl kneader of 10 liters capacity, with constant kneading: 2.20 kg of a 37% aqueous sodium silicate solution (38 Be, molar ratio $Na_2O/SiO_2 = 1:3.3$, pH=11) and 0.64 kg of sodium silicate powder (residue on calcination at 900° C.: 82% by weight).

After a homogeneous mass has formed, a further 1.50 kg of sodium silicate solution (as above) together with 0.42 kg of magnesium oxide "Merck No. 5866" are added in the course of about 15 minutes and the batch is homogenised for a further 10 minutes.

Thereafter, 3.45 kg of calcium silicate (ground wollastonite "P 1" from Cabot Corp., USA) together with 1.50 kg of sodium silicate solution (37%, as above) are introduced in the course of about 15 minutes. The water content of the formulation is about 33.0% by weight.

The mixture is then kneaded for a further 25 minutes at 25°–30° C.

The homogenized kneaded material is emptied out onto drying trays, in layers 20 mm thick. After standing for about 30 hours, the tough dry material is granulated in a screening sieve with a 5 mm insert. The granules contain 20% by weight of water.

The granules are sprinkled onto the conveyor belt of a tunnel oven which has 3 zones, in which the prevailing temperatures are 90°, 120° and 150° C. The lengths of the zones are in the ration of 2:1:1.

The rate of travel is now adjusted so that a product with a water content varying between 8 and 10% by weight can be taken off at the end of the oven, whilst the product from the middle zone has a water content of about 14% by weight.

(B) Use of the Prepolymers 1.0% by weight of zinc stearate is added to the prepolymer obtained as described above, containing 9.5% by weight of water, and the material is ground in a pin mill and directly processed as a compression moulding composition. Compression moulding is carried out at 800–1,000 kg/cm² pressure and 250° C. The rest specimens produced in accordance with DIN 53,470 have the following properties:

| | |
|---|---|
| Specific gravity | 2.17 g/cm² |
| Compressive strength (DIN 53,454) | 65 N/mm² |
| Ball indentation hardness (VDE 0304) | 235 N/mm² |
| Impact strength (VSM 77,107) | 0.07 N.cm/mm² |
| Flexural strength (VSM 77,103) | 23 N/mm² |
| Flammability (UL 94) | 5V |

EXAMPLE 8

(A) Preparation of Prepolymers

The following materials are initially introduced into a bowl kneader of 10 liters capacity, with constant kneading: 2.20 kg of a 37% aqueous sodium silicate solution (38 Be, molar ratio $Na_2O/SiO_2=1:3.3$, pH=11) and 0.64 kg of sodium silicate powder (residue on calcination at 900° C.: 82% by weight).

After a homogeneous mass has formed a further 1.50 kg of sodium silicate solution (as above) together with 0.70 kg of iron(III) oxide are added in the course of about 10 minutes and the batch is homogenised for a further 10 minutes.

Thereafter, 3.45 kg of calcium silicate (ground wollastonite "P 1" from Cabot Corp., USA) together with 1.50 kg of sodium silicate solution (37%, as above) are introduced in the course of about 15 minutes. The water content of the formulation is about 34.0% by weight.

The mixture is then kneaded for a further 25 minutes at 25°–30° C.

The homogenised kneaded material is emptied out onto drying trays, in layers 20 mm thick. After standing for about 20 hours, the tough dry material is granulated in a screening sieve with a 5 mm insert. The granules contain 16% by weight of water.

The granules are sprinkled onto the conveyor belt of a tunnel oven which has 3 zones in which the prevailing temperatures are 90°, 120° and 150° C. The lengths of the zones are in the ratio of 2:1:1.

The rate of travel is now adjusted so that a product with a water content varying between 7 and 8% by weight can be taken off at the end of the oven, whilst the product from the middle zone has a water content of about 10% by weight.

(B) Use of the Prepolymers 1.0% by weight of zinc stearate is added to the prepolymer obtained as described above, containing 7.5% by weight of water, and the material is ground in a pin mill and directly processed as a compression moulding composition. Compression moulding is carried out at 800–1,000 kg/cm² pressure and 250° C. The test specimens produced in accordance with DIN 53,470 have the following properties:

| | |
|---|---|
| Specific gravity | 2.55 g/cm³ |
| Compressive strength (DIN 53,454) | 300 N/mm² |
| Ball indentation hardness (VDE 0304) | 380 N/mm² |
| Impact strength (VSM 77,107) | 0.16 N.cm/mm² |
| Flexural strength (VSM 77,103) | 103 N/mm² |
| Flammability (UL 94) | 5V |
| Light resistance (Xenotest) | >2,000 hours |

EXAMPLE 9

(A) Preparation of Prepolymers

The following materials are initially introduced into a bowl kneader of 10 liters capacity, with constant kneading: 2.70 kg of a 37% aqueous sodium silicate solution (38 Be, molar ratio $Na_2O/SiO_2=1:3.3$, pH=11) and 0.70 kg of sodium silicate powder (residue on calcination at 900° C.: 82% by weight).

After a homogeneous mass has formed, a further 1.50 kg of sodium silicate solution (as above) together with 1.75 kg of dried iron sludge (composition~$Fe_3O_4$; water content≃6% by weight) are added in the course of about 10 minutes and the batch is homogenised for a further 10 minutes.

Thereafter, 3.80 kg of calcium silicate (ground wollastonite "P 1" from Cabot Corp., USA) together with 1.50 kg of sodium silicate solution (37%, as above) are introduced in the course of about 15 minutes. The water content of the formulation is about 31.0% by weight. The mixture is then kneaded for a further 25 minutes at 25°–30° C.

The homogenised kneading material is emptied out onto drying trays, in layers 20 mm thick. After standing for about 22 hours, the tough dry material is granulated in a screening sieve with a 5 mm insert. The granules contain 20% by weight of water.

The granules are sprinkled onto the conveyor belt of a tunnel oven which has 3 zones in which the prevailing temperatures are 90°, 120° and 150° C. The lengths of the zones are in the ration of 2:1:1.

The rate of travel is now adjusted so that a product with a water content varying between 7 and 10% by weight can be taken off at the end of the oven, whilst the product from the middle zone has a water content of about 17% by weight.

(B) Use of the Prepolymers 1.0% by weight of zinc stearate is added to the prepolymer obtained as described above, containing 8.0% by weight of water, and the material is ground in a pin mill and directly processed as a compression moulding composition. Compression moulding is carried out at 800–1,000 kg/cm² pressure and 250° C. The mouldings obtained again exhibit good mechanical strengths.

Comparative Tests

Example A: Reproduction of Example 1 of U.S. Pat. No. 2,948,701

39.6 ml (6.6 parts by volume) of acetone was added dropwise to 300 ml (50 parts by volume) of an aqueous solution of sodium silicate having a weight ratio of $Na_2O:SiO_2$ of 1:2 and 6% of $Na_2O$ and 12% of $SiO_2$. There was then slowly added dropwise to the colourless mixture, with stirring, 150 ml (25 parts by volume) of a 2 N aluminium sulfate solution. After the addition of the aluminium sulfate solution was only ⅔ completed, there commenced to form a precipitate in the reaction solution. After the addition of the aluminium sulfate solution was completed, the reaction mixture was stirred vigorously for a further 10 minutes at room temperature. The suspension obtained was diluted with deionised water, and then filtered with suction. The suction-filter residue was washed with a total of 9 liters of deionised water, and then well filtered off under suction. The suction-filter residue was dried under an infra-red lamp for 8 hours, and subsequently ground. There was obtained a fine white powder which had a water content of 11 percent by weight (product $A_1$).

Example B: Reproduction of Example 6 of U.S. Pat. No. 2,948,701

453.6 g of a sodium silicate solution containing 8.6% $SiO_2$ ($Na_2O:SiO_2 = 1:3.2$) was placed into the reaction vessel and 31.8 g of methanol was added with stirring. The flakes which separated out went into solution again after a short time. 35.3 g of calcium oxide was then well mixed with 50 ml of deionised water, and the suspension thus obtained was slowly added, with stirring, to the sodium silicate solution. After the addition was complete, the reaction product was thoroughly mixed for a further 10 minutes. The resulting slurry was diluted with an amount of water, and then filtered under suction. The residue was taken up twice with water, mixed, and again well filtered with suction. The product was dried for 3.5 hours at 105° C. in an air-circulation oven and the ground. There was obtained a fine white pulverulent product which had a water content of 14 percent by weight (product $A_2$).

Processing of Products $A_1$ and $A_2$ as Moulding Compounds

The products $A_1$ and $A_2$ were processed according to the processing conditions described in Example 4 as moulding materials. The moulding was performed at a pressure of 1000 kg/cm² and at a temperature of 250° C. The moulded articles produced according to DIN 53,470 from the products $A_1$ and $A_2$ had no mechanical strength. The compression-moulded acticles obtained from product $A_1$ were brittle and crumbled on being removed from the mould. The compression-moulded articles from product $A_2$ disintegrated into powder when being removed from the mould.

Fragments of the compression-moulded articles from product $A_1$ were further subjected to the exposure to heat test which comprised heating them in a oven. The fragments fell apart at 250° C.

Fragments of the compression-moulded articles from product $A_1$ were also tested for their resistance to water. After immersion in water for 24 hours at room temperature, the water content of the fragments was 20.1 percent by weight.

Example C: Reproduction of the Example in U.S. Pat. No. 2,919,996

(a) 360 g of a colloidal 30% aqueous silicon dioxide solution was placed into a reaction vessel, and 37 g of boron trioxide was added with stirring. After 20 minutes there was added, with stirring, 174 g of aluminium oxide, and after a further 10 minutes 21 g of zinc oxide. There was formed therefrom after about 30 minutes a light-brwon viscous paste.

(b) 750 g of a 40% aqueous sodium trisilicate solution ($Na_2O:SiO_2 = 1:3.22$), produced by treatment of a 37% sodium trisilicate solution for 3 hours in a rotary evaporator, was placed into a reaction vessel. The paste obtained under (a) was slowly mixed in and a highly viscous mixture was obtained.

(c) 900 g of a 35% aqueous sodium trisilicate solution was mixed with 600 g of a 17.4% aqueous sodium metasilicate solution. Into this solution was then added, with vigorous stirring, the highly viscous mixture produced under (b). After completion of the addition, the reaction mixture was stirred for a further 15 minutes. The resulting suspension was subsequently heated at 105° C. in a rotary evaporator until the reaction solution had a solids content of 41.5% and a gel-like mass, having finely crystalline particles in an aqueous medium was obtained.

Processing of the Product Obtained According to U.S. Pat. No. 2,919,996 into Moulded Articles The viscous reaction solution obtained under (c) was carefully further dehydrated by heating it in a rotary evaporator at between 70° and 120° C. until the water content was 15 percent by weight. Then the product was kept in a circulating air drying cabinet at 120° to 160° C. until the water content had fallen to 7%. The product was subsequently ground, and the powder obtained was moulded, under a pressure of 1000 kg/cm² and at a temperature of 250° C., into shaped specimens according to DIN 53,470, in the cours of which the material commenced to foam in the mould.

A portion of the ground product was then moulded at 200° C. under a pressure of 1000 kg/cm²; compact moulded specimens were obtained, but these decomposed on being heated to 300° C., and subsequently foamed up to about the five-fold volume.

Example D: Reproduction of Example 1 of the U.S. Pat. No. 2,943,948

Six liters of sodium silicate solution ($Na_2O:SiO_2 = 1:3.36$), containing 10 g of $SiO_2$ per liter of solution, were placed into a reaction vessel. There were than slowly added, with vigorous stirring, 6 liters of calcium chloride solution containing 10 g of $CaCl_2$ per liter of solution. The formed fine precipitation was subsequently stirred in the water for a further 30 minutes. The precipitation was filtered off with suction, and repeatedly washed with water. After filtration under suction, the filter cake was taken up in 3 liters of water. There was then added, with stirring, 500 g of a 12.8% aqueous aluminium chloride solution, and the resulting suspension was heated to 71° C. and held for 2 hours at this temperature. After cooling, the reaction product was centrifuged; the obtained product was again washed with water under stirring, and then well filtered off under suction. The product was dried in an air-circulation chamber at 104° C. untill the product had a water content of 14.5 percent by weight. There was obtained on grinding a very fine white, pulverulent product. The powder was moulded at 250° C. under a pressure of 1000 kg/cm²; the compact specimens obtained were hard, but very brittle. On heating the moulded materials to 300° C., they exhibited cracks and lost their strength. After immersion in water for 24 hours at room temperature, the water content of the moulded specimens was 41.5 percent by weight.

Conclusion

The reproductions of Examples described in U.S. Pat. Nos. 2,948,701; 2,919,996 and 2,943,948 clearly demonstrate that it is not possible according to said prior art procedures to obtain prepolymers on the basis of alkali metal silicates which are suitable for the manufacture of satisfactory mouldings by the use of heat and pressure.

What is claimed is:

1. A prepolymer which is the reaction product of an alkali metal silicate with a divalent to tetravalent metal oxide or with said metal oxide and an alkaline earth silicate, which product is moldable by heat and pressure, and which is obtained by a method wherein
   (a) a mixture of solid alkali metal silicate and water or a mixture of solid alkali metal silicate and an aqueous solution of said silicate is combined and thoroughly homogenized at a temperature of 20° to 50° C. with a divalent, trivalent or tetravalent metal oxide or with said metal oxide and an alkaline earth metal silicate, the ratio of metal oxide to silicate being from 1:1 to 1:9, expressed in parts by weight of solids, the combined homogenized mixture having a water content of from 25 to 50% by weight, based on the total mixture;
   (b) said homogenized mixture is allowed to stand at a temperature of 20° to 50° C. to permit formation of the prepolymer product to occur with the concomitant decrease in the water content of the mixture to 15 to 32% by weight, which prepolymer product is sufficiently tough and dry to permit comminution;
   (c) said product is comminuted; and is then dried at a temperature of 90°–120° C. to reduce the water content of the prepolymer product to a level of 2 to 20% by weight.

2. A prepolymer according to claim 1, obtained from a homogenized mixture of solid hydrated alkali metal silicate and alkaline earth metal silicate and an aqueous solution of alkali metal silicate, and a divalent metal oxide, the homogenized mixture having a water content of from 30 to 45% by weight.

3. A prepolymer according to claim 1, obtained from a homogenized mixture of solid hydrated alkali metal silicate and an aqueous solution of alkali metal silicate and zinc oxide.

4. A prepolymer according to claim 3, obtained from a homogenized mixture of solid sodium silicate and an aqueous solution of sodium silicate and zinc oxide.

5. A process for the preparation of a prepolymer according to claim 1 which comprises
   (a) combining and thoroughly homogenizing at a temperature of 20° to 50° C. a mixture of solid alkali metal silicate and water or a mixture of solid alkali metal silicate and an aqueous solution of said silicate with a divalent, trivalent or tetravalent metal oxide or with said metal oxide and an alkaline earth metal silicate, the ratio of metal oxide to silicate being from 1:1 to 1:9, expressed in parts by weight of solids, the combined homogenized mixture having a water content of from 25 to 50% by weight, based on the total mixture;
   (b) allowing said homogenized mixture to stand at a temperature of 20° to 50° C. to permit formation of the prepolymer product to occur with the concomitant decrease in the water content of the mixture to 15 to 32% by weight, which prepolymer product is sufficiently tough and dry to permit comminution;
   (c) comminuting the prepolymer product; and
   (d) drying the comminuted prepolymer at a temperature of 90°–120° C. to reduce the water content of the prepolymer product to a level of 2 to 20% by weight.

6. A process according to claim 5, wherein a homogenized mixture of solid hydrated alkali metal silicate and alkaline earth metal silicate and an aqueous solution of alkali metal silicate, and a divalent metal oxide, the homogenised mixture having a water content of from 30 to 45% by weight, is used.

* * * * *